(12) United States Patent
Honda

(10) Patent No.: US 8,060,793 B2
(45) Date of Patent: Nov. 15, 2011

(54) PROCESSOR OPERATION INSPECTION SYSTEM AND OPERATION INSPECTION CIRCUIT

(75) Inventor: Makoto Honda, Menlo Park, CA (US)

(73) Assignees: Toyota Infotechnology Center Co., Ltd., Tokyo (JP); Toyota Jidosha Kabushiki Kaisha, Toyota (JP)

( * ) Notice: Subject to any disclaimer, the term of this patent is extended or adjusted under 35 U.S.C. 154(b) by 169 days.

(21) Appl. No.: 12/451,949

(22) PCT Filed: Jun. 13, 2008

(86) PCT No.: PCT/JP2008/061276
§ 371 (c)(1),
(2), (4) Date: Dec. 9, 2009

(87) PCT Pub. No.: WO2008/153214
PCT Pub. Date: Dec. 18, 2008

(65) Prior Publication Data
US 2010/0107005 A1    Apr. 29, 2010

(30) Foreign Application Priority Data
Jun. 13, 2007    (JP) .................... 2007-156640

(51) Int. Cl.
*G06F 11/00* (2006.01)
(52) U.S. Cl. ........................................ 714/49
(58) Field of Classification Search .............. 714/49; 712/227; 702/108–126
See application file for complete search history.

(56) References Cited

U.S. PATENT DOCUMENTS

| | | | |
|---|---|---|---|
| 4,773,028 A * | 9/1988 | Tallman | 714/736 |
| 5,161,115 A | 11/1992 | Teshima et al. | |
| 5,606,566 A * | 2/1997 | Whetsel | 714/729 |
| 5,715,178 A * | 2/1998 | Scarola et al. | 702/116 |
| 7,158,906 B2 * | 1/2007 | Maruno | 702/108 |
| 7,299,447 B2 * | 11/2007 | Spirkl | 717/112 |
| 7,580,807 B2 * | 8/2009 | Bullock et al. | 702/117 |
| 2003/0126473 A1 | 7/2003 | Maciorowski et al. | |
| 2005/0038621 A1 * | 2/2005 | Maruno | 702/108 |
| 2009/0048796 A1 * | 2/2009 | Yamamoto et al. | 702/69 |

FOREIGN PATENT DOCUMENTS

| | | |
|---|---|---|
| JP | A-03-099227 | 4/1991 |
| JP | A-04-333171 | 11/1991 |
| JP | A-2003-150280 | 5/2003 |
| JP | A-2003-177943 | 6/2003 |
| JP | A-2003-271412 | 9/2003 |
| JP | A-2005-032191 | 2/2005 |

OTHER PUBLICATIONS

International Search Report issued in International Application No. PCT/JP2008/061276 on Aug. 12, 2008 (with translation).
El-Fakih et al., "FSM-Based Incremental Conformance Testing Methods," *IEEE Transactions on Software Engineering*, vol. 30, No. 7, Jul. 2004, IEEE Computer Society.
German Office Action dated Oct. 8, 2010 in German Patent Application No. 11 2008 001 590.2-53 (with translation).

* cited by examiner

*Primary Examiner* — Amine Riad
(74) *Attorney, Agent, or Firm* — Oliff & Berridge, PLC (57) ABSTRACT

A processor operation inspection system includes a processor and an operation inspection circuit that inspects an operation of the processor. When a program under execution changes from one predefined state to another state, the processor outputs a state switching signal indicating a transition of its state, a state signal indicating a current state to the inspection circuit. The inspection circuit includes a state register that stores the state of the processor, a combinational logic circuit that calculates, according to the stored state of the processor and the state switching signal, a new state to be taken by the processor, and a comparison circuit that inspects the operation of the processor by comparing the calculated new state to the state of the processor inputted as the state signal.

4 Claims, 8 Drawing Sheets

PROCESSOR OPERATION INSPECTION SYSTEM AND OPERATION INSPECTION CIRCUIT

TECHNICAL FIELD

The present invention relates to a technique of inspecting whether a processor is operating normally.

BACKGROUND ART

Conventionally, a watchdog timer (WDT) technology has been used for the purpose of detecting a failure of a microprocessor (for example, Japanese patent application laid-open No. 2003-150280). When a signal transmitted at a predetermined interval from a processor comes to a halt, a watchdog timer outputs a reset pulse to the processor. When the processor receives this reset pulse, it resets itself to restore its function. In this manner, by using the watchdog timer technology, it is possible to detect that the processing of the processor has been stopped due to a fault, etc. In addition, in such a case, it is possible for the processor to perform the restoration of its function.

Also, as a technology for conducting tests (debug) without the use of real circuits, there has been known a virtual tester technology (for example, Japanese patent application laid-open No. 2005-32191). A virtual tester is a technology that conducts tests by simulation on a computer using a model of a program to be tested which is modeled by a hardware description language (HDL) without using a real machine or system.

In addition, there has also been known a technique in which instead of making a built-in circuit for monitoring an FPGA (field programmable gate array) small-scale, a large-scale memory module is provided outside the FPGA and is connected thereto through a high speed transmission line (Japanese patent application laid-open No. 2003-271412). With such, it is possible to monitor the operation of the FPGA without regard to the circuit scale thereof.

However, in the case of the above-mentioned conventional technologies, there have been the following problems.

First, with a technology using a virtual tester as described in Japanese patent application laid-open No. 2005-32191, the operation of a real system can not be inspected. In addition, with a technology using a watchdog timer as described in Japanese patent application laid-open No. 2003-150280, it can be checked that a processor is operating, but it can not be verified whether the processor is operating correctly or normally.

The abnormal operation of a processor is attributable to the following causes. The first is a defect (bug) of a program, and is that the processor does not operate according to its specifications.

The second is an alteration of a program by a malicious third party. In recent years, a reconfigurable processor such as an FPGA, etc., has been frequently used as a processor. With an FPGA, the operation of the processor can be changed by changing circuit information (program). Accordingly, in the case of a version upgrade of the program or the like, the operation of the processor can be easily changed by providing a new program to the processor. However, a program provided from outside may have been rewritten by a third party. In such a case, an operation different from a manufacturer's intention will be carried out.

The third is a soft error. The soft error is an error resulting from the data held in a memory being inverted under the influence of radiation such as high energy neutrons. The probability of occurrence of soft errors is increased according to the miniaturization of LSI design rules in recent years. Although this can be dealt with by using a memory with an error correction function, it is difficult to adopt such a memory having an error correction function because of an increase in cost.

DISCLOSURE OF THE INVENTION

Thus, the abnormal operation of a processor includes a variety of types of abnormalities other than the fact that the processing of the processor simply stops, and it is required to detect such abnormalities.

The present invention has been made in view of the above-mentioned circumstances, and has for its object to provide a technology that can inspect whether a processor is operating normally.

In order to achieve the above object, in the present invention, the operation of a processor is verified by the following means or processing.

The present invention is a processor operation inspection system which comprises a processor and an operation inspection circuit for inspecting an operation of the processor.

The processor interprets and executes a program stored in a memory. The processing of the program is executed while passing through predefined states. In addition, the processor has a state switching signal output unit that outputs a state switching signal to notify a state transition to the operation inspection circuit at the time when it changes from one state into another state. Also, the processor has a state output unit that outputs a state signal to notify a current state thereof to the operation inspection circuit.

Here, note that a "state" is a state of the program executed on the processor, but in the description of the present invention, it is also expressed simply as "a state of the processor."

Here, what kind of unit (granularity) is used to define a state can be properly designed. The state switching signal is a predefined signal pattern indicating a transition of a state. Thus, the processor notifies, at the time of a transition of a state, the transition to the operation inspection circuit, and at the same time notifies a current state to the operation inspection circuit.

The operation inspection circuit has a state switching signal input unit, a state signal input unit, a state storage unit, a state calculation unit, and an inspection unit. The state switching signal input unit receives an input of a state switching signal from the processor. The state signal input unit receives an input of a state signal from the processor. The state storage unit stores the state of the processor. The state calculation unit calculates a new state to be taken by the processor from the state of the processor stored in the state storage unit and the state switching signal. The state storage unit and the state calculation unit are a state machine that simulates a state transition, and are designed according to the specifications of the processor. The inspection unit inspects the operation of the processor by making a comparison between the new state to be taken by the processor which has been calculated by the state calculation unit and the state of the processor inputted through the state signal input unit. In cases where the state calculated by the state calculation unit is different from the current operation of the processor, the inspection unit determines that there has been a fault in the operation of the processor.

Thus, the behavior of the processor can be monitored by forming a state machine in the operation inspection circuit, and by conducting successive inspections of the state transition.

In cases where it is determined that there has been a fault in the operation of the processor, the inspection unit may notify a new state to be taken by the processor to the processor. Then, the processor that has received this notice may perform a restoration from an incorrect state to the normal state.

If a restoration to a correct state notified from the operation inspection circuit can be performed in this manner, the processor can be restored quickly as compared with the case where the processor is reset.

In addition, in cases where the processor is able to execute a plurality of tasks, the processor operation inspection system according to the present invention may include a plurality of operation inspection circuits corresponding to the plurality of tasks, respectively. In this case, the processor operation inspection system further includes a switching unit that switches among the plurality of operation inspection circuits according to a task which is being executed by the processor so that one of said operation inspection circuits is to be used for inspecting the operation of the processor.

In cases where the processor is a multitasking system or the like capable of executing a plurality of tasks, it is difficult for a single operation inspection circuit to inspect the state transitions of all the tasks. Consequently, by providing an operation inspection circuit for each task, it is possible to cope with the case in which a plurality of tasks are executed.

In addition, in cases where the processor is able to execute a plurality of tasks, it is also preferable that an operation inspection circuit be composed of a reconfigurable processor, and that the operation inspection circuit be reconfigured according to a task which is being executed by the processor. Specifically, it is preferable that the processor operation inspection system according to the present invention further include a circuit information storage unit that stores circuit information of operation inspection circuits corresponding to said plurality of tasks, respectively, and a control unit that loads the circuit information corresponding to the task onto the reconfigurable processor according to a task which is being executed by the processor. An FPGA (field programmable gate array) is included in the reconfigurable processor.

With such a configuration, it is possible to cope with the processor that performs a plurality of tasks. In addition, the plurality of tasks can be dealt with by rewriting the program of the reconfigurable processor, so a chip area can be reduced.

Here, note that the present invention can also be viewed as a processor operation inspection method including at least a part of the above-mentioned processing, or a program for achieving such a method. In addition, the present invention can also be viewed as an operation inspection circuit for inspecting an operation of the above-mentioned processor. Each of the above-mentioned units and processes can be combined with others as much as possible so as to achieve the present invention.

For example, an operation inspection circuit as one aspect of the present invention resides in an operation inspection circuit for inspecting an operation of a processor, which is characterized by comprising: a state switching signal input unit that receives an input of a state switching signal indicating a transition of a state of the processor, outputted from the processor; a state signal input unit that receives an input of a state signal indicating a current state of the processor, outputted from the processor; a state storage unit that stores the state of the processor; a state calculation unit that calculates a new state to be taken by the processor from the state of the processor stored in the state storage unit and the state switching signal; and an inspection unit that inspects the operation of said processor by making a comparison between the new state to be taken by the processor which has been calculated by the state calculation unit and the state of the processor inputted through the state signal input unit.

According to the present invention, it becomes possible to inspect whether a processor is operating normally.

BEST MODE FOR CARRYING OUT THE INVENTION

Hereinafter, preferred embodiments of this invention will be described in detail by way of example with reference to the attached drawings.

First Embodiment

Construction

Figure 1A:
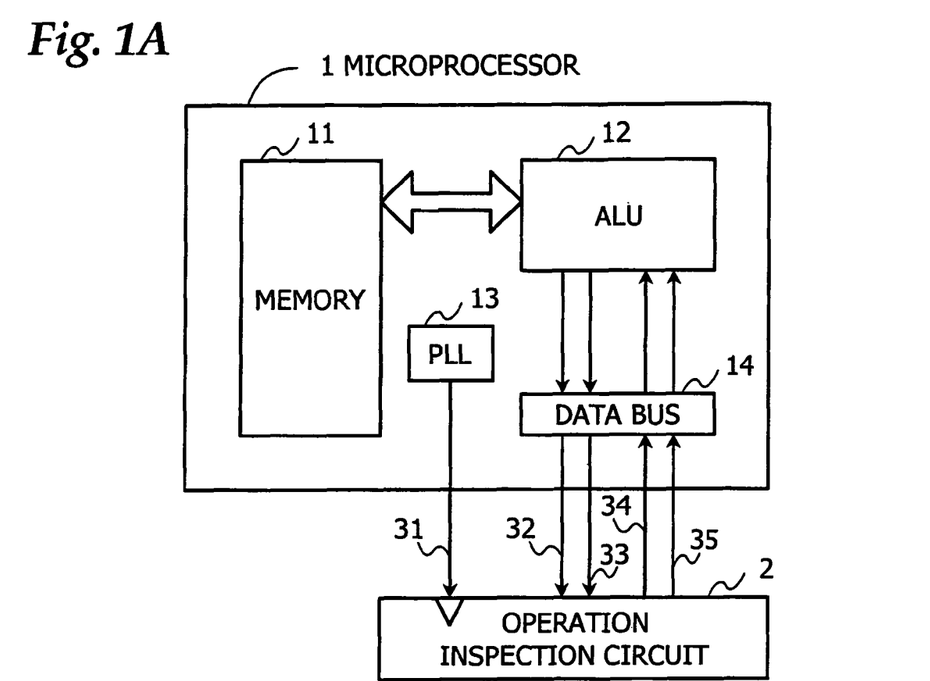
FIG. 1A is a view showing the overall construction of a microprocessor operation inspection system according to a first embodiment of the present invention.
Figure 1B:
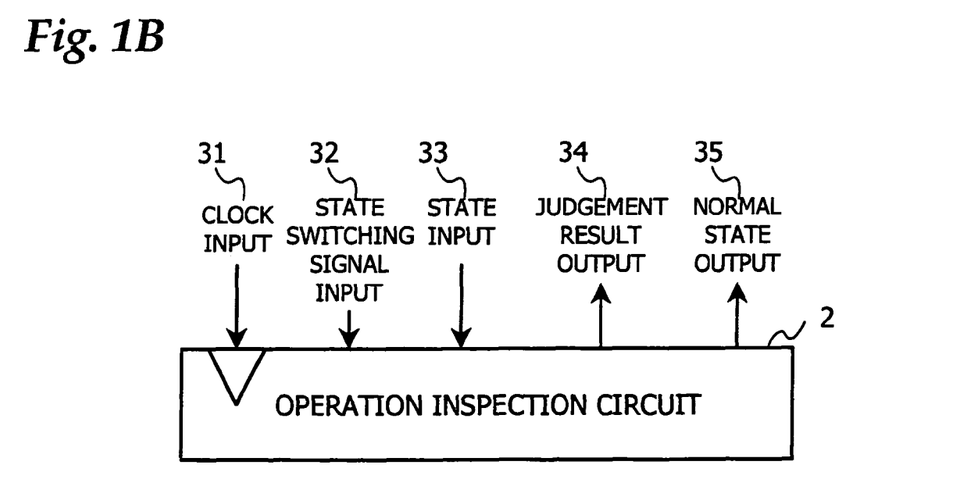
FIG. 1B is a view showing signals exchanged between a microprocessor and an operation inspection circuit.
Figure 2:
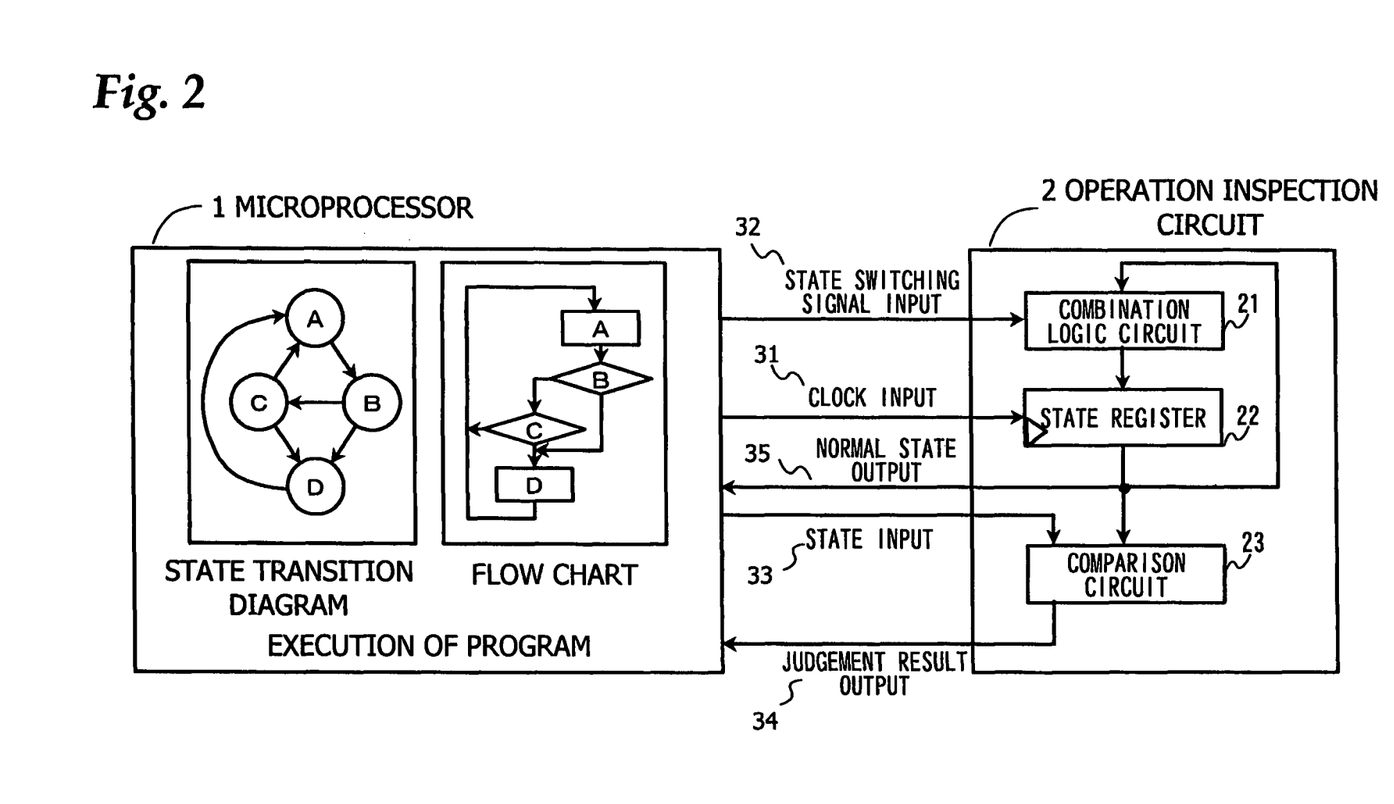
FIG. 2 is a view showing the overall construction of the microprocessor operation inspection system according to the first embodiment of the present invention.

FIGS. 1 and 2 are views showing the overall construction of a microprocessor operation inspection system according to a first embodiment of the present invention. FIG. 1A shows the construction of a microprocessor 1, and FIG. 1B shows signals that are exchanged between the microprocessor 1 and an operation inspecting circuit 2. The microprocessor 1 includes a memory 11, an ALU (arithmetic logic unit) 12, and a PLL (phase-locked loop) 13, and a data path 14. FIG. 2 is a view showing the construction of the operation inspecting circuit 2.

A program is loaded into the memory 11, and this program is executed by the ALU 12. In this program, a plurality of states are defined beforehand and a transition among the states can be grasped in a program. In FIG. 2, there is schematically illustrated by a state transition diagram and a flow chart that the program of the microprocessor 1 can take states A through D. However, in practice, it is needless to say that the program can take much more states.

Here, it may be arbitrary what kind of unit is defined as one state. For example, a group of processing routines between a conditional branch and the following conditional branch can be defined as one state. In addition, a subroutine, a function, or the like can also be defined as one state. Here, explanation will be made on the assumption that a group of processing routines between conditional branch sentences are defined as one state.

The microprocessor 1 supplies a state switching signal 32 to the operation inspection circuit 2 when a transition of its state takes place. In this embodiment, the state switching signal 32 is data in which the condition of a conditional branch sentence such as an if-then statement or the like is coded. However, the state switching signal 32 may be anything as long as it is data (signal) that can notify a transition of the state.

The microprocessor 1 also supplies a state signal 33 that notifies the current state thereof to the operation inspection circuit 2.

A signal output from the microprocessor 1 is performed by writing into an input/output port of the microprocessor 1. In addition, a signal input into the microprocessor 1 is performed by reading a signal at the input/output port thereof. That is, the input/output ports of the microprocessor 1 and the operation inspection circuit 2 correspond to various kinds of signal input units and signal output units.

The operation inspection circuit 2 is composed of reconfigurable hardware such as an FPGA or the like. In this FPGA, there is implemented as a state machine a circuit that simulates a program executed by the microprocessor 1. The state machine is a sequential circuit and is composed of a combinational logic circuit 21 and a state register 22. The state machine is designed by using an HDL (hardware description language) for implementation in the FPGA while referring to the specifications of an application program and the source code of the program. The last state of the microprocessor 1 is stored in the state register 22. And, when the data stored in the state register 22 and the state switching signal 32 inputted from the microprocessor 1 are inputted into the combinational logic circuit 21, there occurs a new state, which is stored into the state register 22. That is, the combinational logic circuit 21 corresponds to a state calculation unit of the present invention, and the state register 22 corresponds to a state storage unit of the present invention.

The comparison circuit 23 corresponds to an inspection unit of the present invention, and determines whether the value of the state register 22 matches the state signal 33 inputted from the microprocessor 1, by making a comparison therebetween. When they match each other, the comparison circuit notifies to the microprocessor 1 a determination result 34 indicating that the state of the microprocessor 1 is normal. Upon receipt of a normal message as the determination result, the microprocessor 1 makes a transition of its state and performs the following state.

On the contrary, when the value of the state register 22 and the state signal 33 inputted from the microprocessor 1 do not match each other, it can be taken that there has occurred a fault or failure in the microprocessor 1. In this case, a determination result 34 indicating that the state of the microprocessor 1 is abnormal is notified to the microprocessor 1. In addition, since the state which the microprocessor 1 should originally take is stored in the state register 22, this normal state is outputted as a normal state 35 to the microprocessor 1. The microprocessor 1 tries to restore its state to the normal state from the incorrect or abnormal state by making reference to this normal state.

Figure 3:
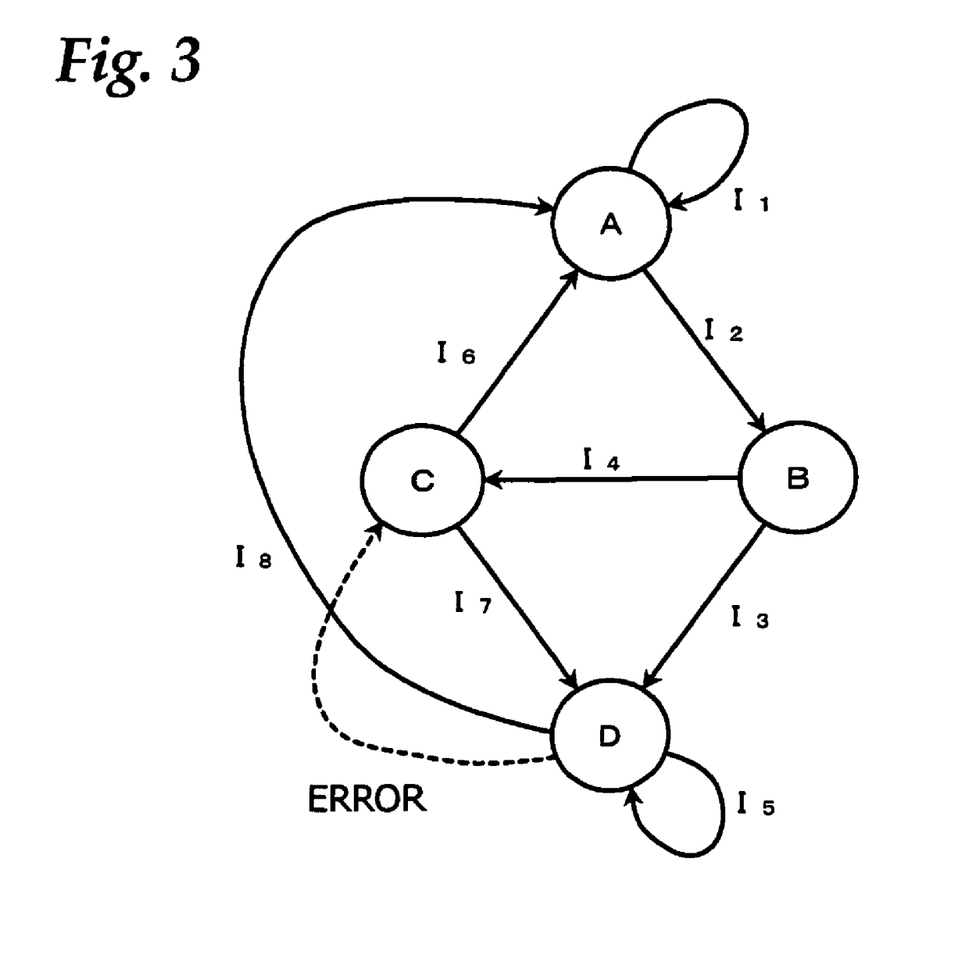
FIG. 3 is a state transition diagram of a program that is executed by the microprocessor.
Figure 4:
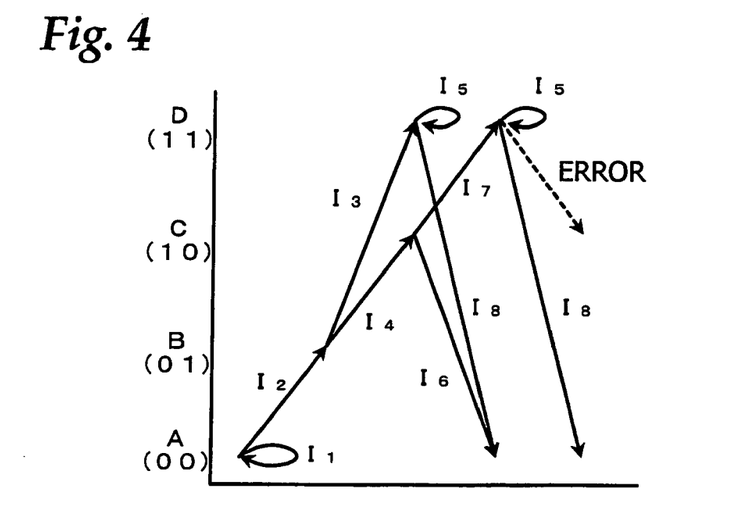
FIG. 4 is a diagram (trellis diagram) showing in a time series manner the state transition of the program that is executed by the microprocessor.

FIG. 3 is a state transition diagram showing one example of a transition of the state of the program that is executed by the microprocessor 1. FIG. 4 is a diagram (trellis diagram) showing the state transition of FIG. 3 in a time series manner. In this example, the four states A through D are defined as states which can be taken, and transitions among these states are predetermined. For example, a transition from state A is made only to state A or B, and a transition from state B is made only to state C or D. Here, note that each transition is denoted by Ij.

In this way, the state of the microprocessor 1 is determined beforehand from the specifications of the program, etc., so it is found that a transition from state D to state C does not take place as long as the microprocessor 1 performs a normal operation, as shown in a dotted line in FIG. 3. Accordingly, when such an unassumed state transition is generated, it is found that a fault has occurred in the microprocessor 1. In addition, for example, in cases where the state of the microprocessor 1 has changed from state B to state C in spite of the occurrence of a transition I3 in the state B (correctly the microprocessor state should change from state B to state D), too, it is similarly found that a fault has occurred in the microprocessor 1.

Figure 5:
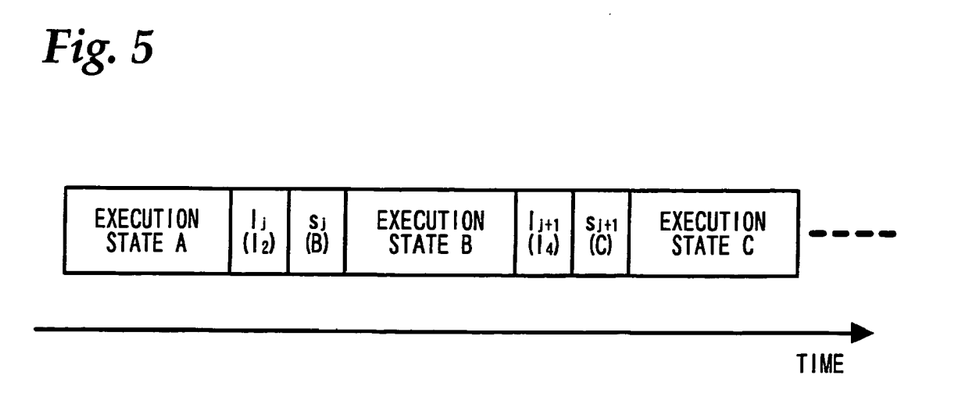
FIG. 5 is a view showing a time chart of data output from the microprocessor to the operation inspection circuit and the execution of processing in the microprocessor operation inspection system according to the first embodiment of the present invention.

FIG. 5 is a view showing a time chart of the data output from the microprocessor 1 to the operation inspection circuit 2 and the execution of processing thereof. At the time when the microprocessor 1 changes its state, it starts the processing of a new state (sj) after outputting a transition Ij and a following state sj to the operation inspection circuit 2 as state switching signals. FIG. 5 shows an example in the case where the state of the microprocessor 1 is changed in the order of A-B-C, in which after completion of the processing in the state A, I2 indicating a transition from state A to state B is outputted as a state switching signal, and upon the transition to the state B, a state signal indicating the state B is outputted. It is also the same at the time when the state is changed from state B to state C.

<Processing Flow>

Figure 6:
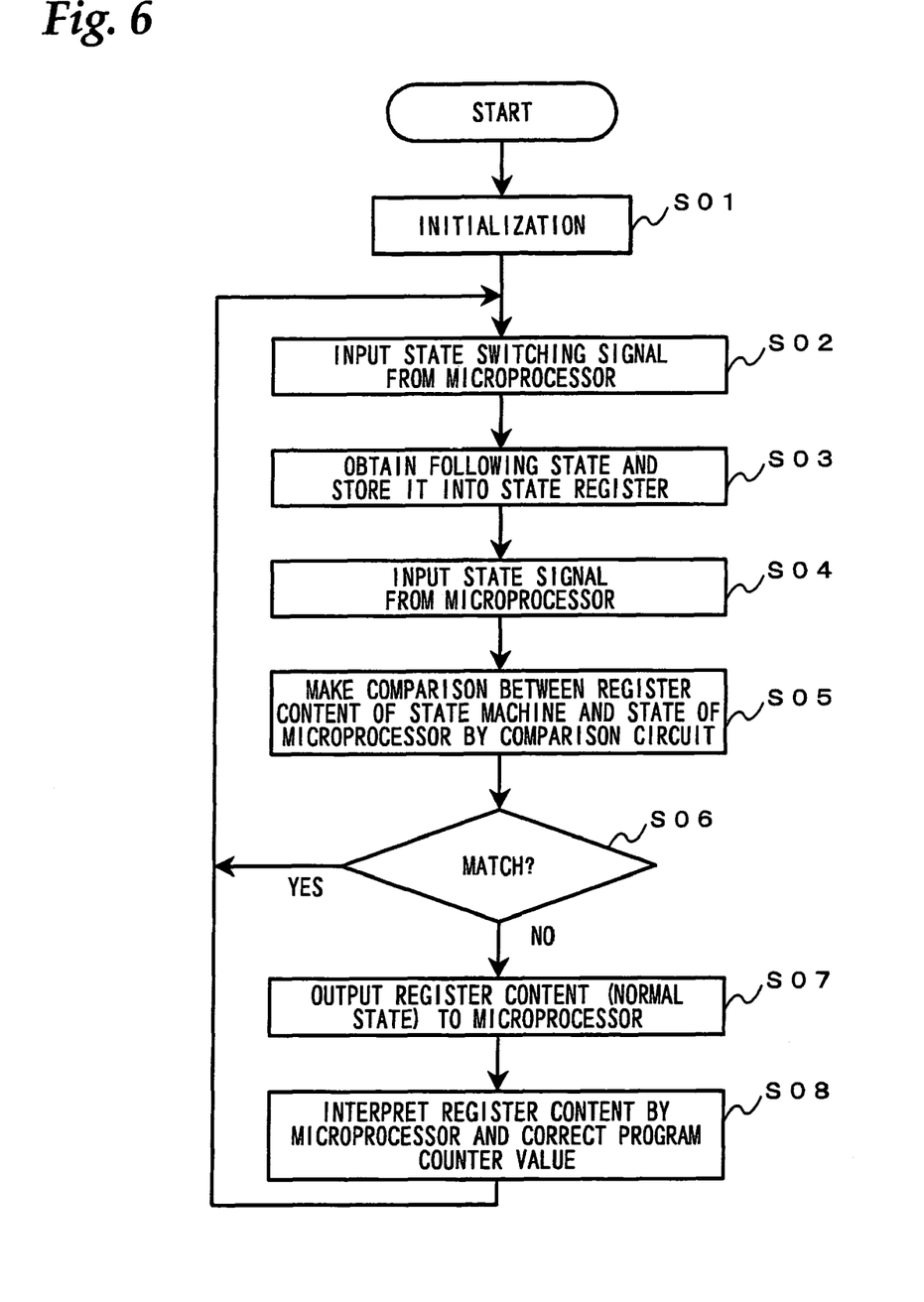
FIG. 6 is a flow chart showing an example of the operation of the microprocessor operation inspection system according to the first embodiment of the present invention.

FIG. 6 is a flow chart showing an example of the operation of a processor operation inspection system according to this embodiment. First, a power supply is turned on, initialization processing (S01) of the microprocessor 1 and the operation inspection circuit 2 is carried out. Then, the operation inspection circuit 2 receives an input of the state switching signal 32 from the microprocessor 1 (S02). The combinational logic circuit 21 calculates a new state from the current content of the state register 22 and the state switching signal 32 thus inputted, and stores it into the state register 22 (S03). In addition, the operation inspection circuit 2 receives an input of the state signal 33 from the microprocessor 1 (S04). Then, the comparison circuit 23 makes a comparison between the content of the state register 22 of the state machine and the inputted state of the microprocessor 1 (state signal 33) (S05). It is determined whether these match each other (S06), and when there is a match therebetween (S06: YES), it is found that the state of the microprocessor 1 is normal. The operation inspection circuit 2 outputs this determination result 34 to the microprocessor 1, and returns to step S02 where it continues the inspection.

On the other hand, when the content of the state register 22 of the state machine and the inputted state of the microprocessor 1 do not match each other (S06: NO), it is found that the state of the microprocessor 1 is abnormal. The operation inspection circuit 2 outputs this determination result 34 to the microprocessor 1, and at the same time outputs a state which is stored in the state register 22 as a normal state to the microprocessor 1 (S07). The microprocessor 1, receiving this, interprets the register content, corrects a program counter, and tries to restore it to a normal state. Here, the program counter may be reset in cases where the restoration can not be made by correcting the program counter.

In this manner, the operation of the microprocessor 1 can be inspected by the use of the operation inspection circuit 2.

Operation/Effect of this Embodiment

According to the microprocessor operation inspection system of this embodiment, it is possible to detect abnormalities of the microprocessor due to the influence of a fault or soft error by simulating the state transition of the program of the microprocessor with the state machine of the operation inspection circuit. In addition, at that time, by notifying a correct state to the microprocessor from the operation inspection circuit, it is also possible to restore the state of the microprocessor to the correct state. This has an advantage that the restoration can be made more quickly than restoration by a reset signal.

Second Embodiment

Figure 7:
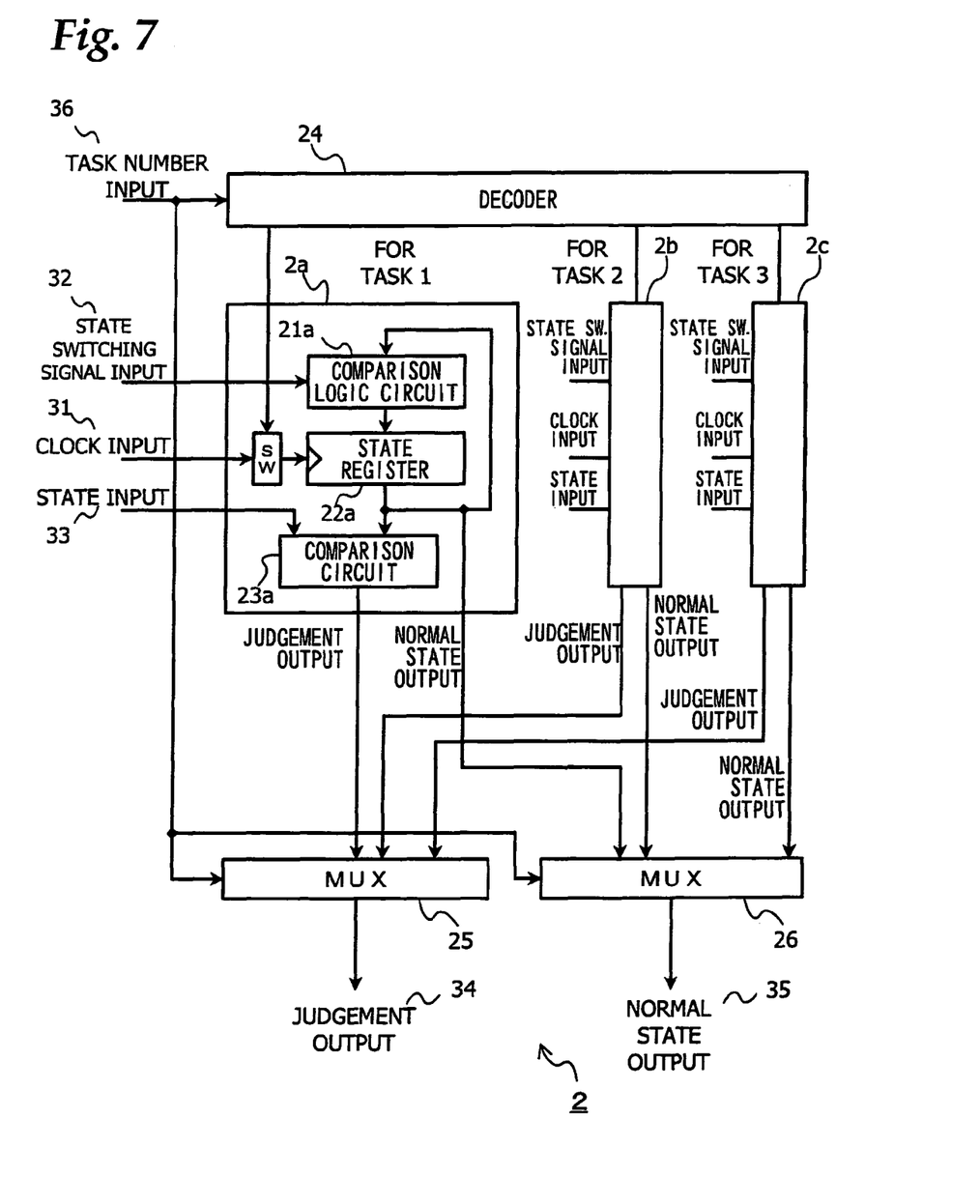
FIG. 7 is a view showing the construction of an operation inspection circuit in a microprocessor operation inspection system according to a second embodiment of the present invention.

FIG. 7 is a view showing the construction of an operation inspection circuit 2 in an operation inspection system according to a second embodiment of the present invention. In this embodiment, a microprocessor 1 is assumed to be a processor which performs multitasking processing. As shown in this figure, state machines 2a through 2c are implemented according to a plurality of tasks. Here, three state machines are implemented, but the number of the state machines to be employed may be arbitrary.

Figure 8:
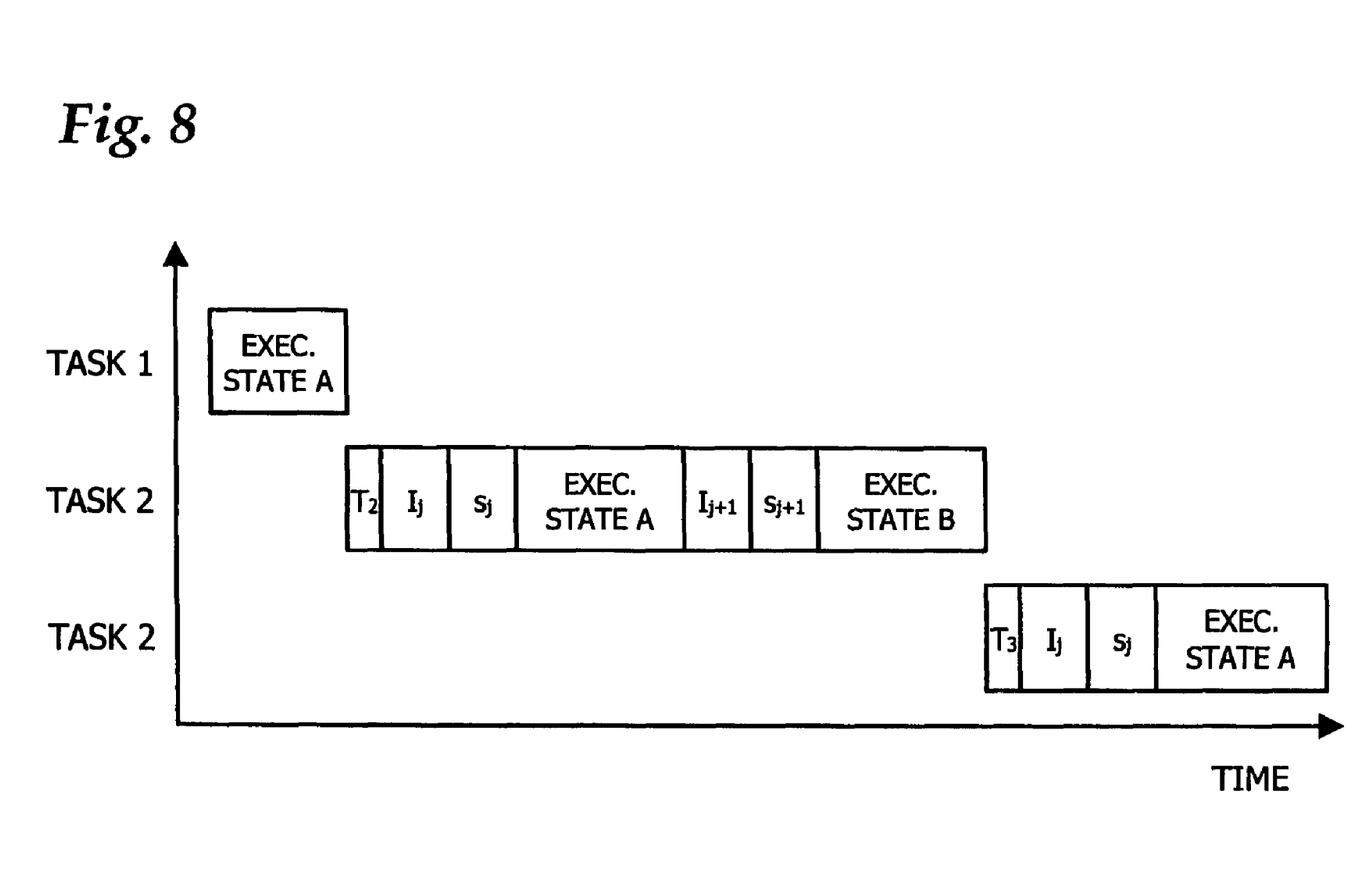
FIG. 8 is a view showing a time chart of data output from a microprocessor to the operation inspection circuit and the execution of processing in the microprocessor operation inspection system according to the second and third embodiments of the present invention.

FIG. 8 is a view showing a time chart of the data output from the multitasking capable microprocessor 1 to the operation inspection circuit 2 and the execution of processing thereof. This time chart is substantially the same as that of the first embodiment (FIG. 5) during the time of performing one task. However, it is different therefrom in that a task number (Ti) is outputted at the time when the task to be performed is changed.

The microprocessor 1 is a multitasking capable processor that is able to process a plurality of tasks while performing switching among them. The microprocessor 1 outputs, in addition to the signals described in the above-mentioned first embodiment, a task number 36 that notifies the number of current tasks under execution to the operation inspection circuit 2. This task number input is made to a decoder 24 and multiplexers (MUX) 25, 26 of the operation inspection circuit 2. In addition, signals (a state switching signal 32, a state input signal 33, and a clock pulse 31) as described in the above-mentioned first embodiment are inputted to the respective state machines 2a through 2c.

The decoder 24 determines which state machine is used to perform an inspection depending on the task that is being executed by the microprocessor 1. The multiplexer 25 determines, according to the task number under execution, which of determination outputs that have been made by the respective state machines is outputted as a determination result output 34. Also, the multiplexer 26 determines, according to the task number under execution, which of the normal states that have been determined by the respective state machines is outputted as a normal state output 35. In this manner, which state machine is used to inspect the operation of the microprocessor 1 is changed by the decoder 24 and the multiplexers 25, 26. That is, the decoder 24 and the multiplexers 25, 26 correspond to a change unit of the present invention.

According to the operation inspection system of this embodiment, in cases where a microprocessor performs a multitask operation, the inspection of the operation of the microprocessor can be conducted by tracking the state transition of each task.

Third Embodiment

Figure 9:
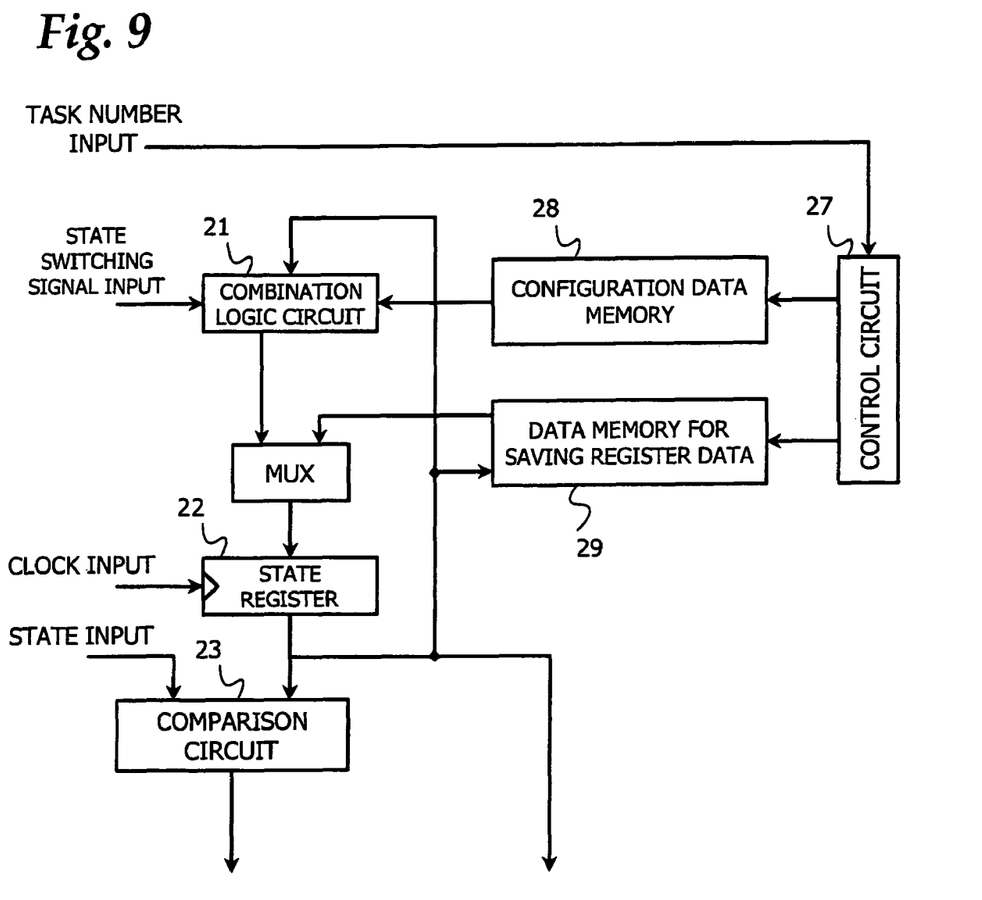
FIG. 9 is a view showing the construction of the operation inspection circuit in the microprocessor operation inspection system according to the third embodiment of the present invention.

FIG. 9 is a view showing the construction of an operation inspection circuit 2 in an operation inspection system according to a third embodiment of the present invention. In this embodiment, a microprocessor 1 is assumed to be a processor which performs multitasking processing, as in the above-mentioned second embodiment. In this embodiment, only one state machine is used. However, the state machine is implemented by a reconfigurable processor such as an FPGA, so that the operation of the microprocessor 1 can be inspected by configuring the FPGA according to a task which is being carried out by the microprocessor 1.

Circuit information (configuration data) for configuring the state machine on the FPGA according to each task executed by the microprocessor 1 is stored in a configuration data memory 28.

A control circuit 27 determines from a task number input when the task that is executed by the microprocessor 1 has been changed. When the task is changed, the circuit information corresponding to a changed task is loaded into the FPGA from the configuration data memory 28.

The data memory 29 for saving register data stores therein the value of a state register 22. That is, the data memory 29 is used to save the value of the state register 22 when the task executed by the microprocessor 1 is changed to rewrite the state machine. In addition, when the control circuit 27 rewrites the FPGA, the value of the state register 22 saved into the data memory 29 for saving register data is returned.

In this manner, the state machine can be implemented by one FPGA, so a required circuit area can be made smaller.

(Modification)

The performance of the microprocessor 1 can be measured by using the operation inspection systems described in the above-mentioned embodiments. In this case, the operation inspection circuit 2 is provided with a processing time counter (a processing time measurement unit) that measures a processing time in each state. When tracking the state transition of the microprocessor 1, the processing time counter measures the sojourn time of each state by counting clock pulses, and measures the operation time of the processing that is performed in each state. Then, the data of the processing time thus actually measured is fed back to the microprocessor 1, whereby the microprocessor is controlled to maintain the real time performance thereof.

The invention claimed is:

1. A processor operation inspection system which is composed of a processor and an operation inspection circuit that inspects an operation of said processor, wherein
said processor comprises:
a state switching signal output unit that outputs a state switching signal indicating a state transition to said operation inspection circuit at the time of a transition from one predefined state to another state; and
a status output unit that outputs a state signal indicating a current state to said operation inspection circuit; and
said operation inspection circuit comprises:
a state switching signal input unit that receives an input of said state switching signal;

a state signal input unit that receives an input of said state signal;

a state storage unit that stores the state of said processor;

a state calculation unit that calculates a new state to be taken by said processor from the state of said processor stored in said state storage unit and said state switching signal; and an inspection unit that inspects the operation of said processor by making a comparison between the new state to be taken by said processor which has been calculated by said state calculation unit and the state of said processor inputted through said state signal input unit; and said processor is able to execute a plurality of tasks;

said operation inspection circuit is composed of a reconfigurable processor; and said operation inspection circuit further comprises a circuit information storage unit that stores circuit information of said operation inspection circuits corresponding to said plurality of tasks, respectively; and a control unit that loads the circuit information corresponding to said task into said reconfigurable processor according to a task which is being executed by said processor.

2. The processor operation inspection system as set forth in claim 1, wherein in cases where the operation of said processor is abnormal, said operation inspection circuit outputs a new state, which is to be taken by said processor and which is calculated by said state calculation unit, to said processor thereby to restore said processor to a normal state.

3. An operation inspection circuit which inspects an operation of a processor, comprising:

a state switching signal input unit that receives an input of a state switching signal indicating a transition of a state of said processor, outputted from said processor;

a state signal input unit that receives an input of a state signal indicating a current state of said processor, outputted from said processor;

a state storage unit that stores the state of said processor;

a state calculation unit that calculates a new state to be taken by said processor from the state of said processor stored in said state storage unit and said state switching signal; and an inspection unit that inspects the operation of said processor by making a comparison between the new state to be taken by said processor which has been calculated by said state calculation unit and the state of said processor inputted through said state signal input unit;

said processor is able to execute a plurality of tasks;

said operation inspection circuit is composed of a reconfigurable processor; and said operation inspection circuit further comprises a circuit information storage unit that stores circuit information of said operation inspection circuits corresponding to said plurality of tasks, respectively; and a control unit that loads the circuit information corresponding to said task into said reconfigurable processor according to a task which is being executed by said processor.

4. The operation inspection circuit as set forth in claim 3, wherein in cases where the operation of said processor is abnormal, a new state, which is to be taken by said processor and which is calculated by said state calculation unit, is outputted to said processor thereby to restore said processor to a normal state.

* * * * *